(12) United States Patent
Medina et al.

(10) Patent No.: US 8,018,924 B1
(45) Date of Patent: *Sep. 13, 2011

(54) NETWORK DEVICE WITH MULTIPLE MAC/PHY PORTS

(75) Inventors: Eitan Medina, Ramat Hasharon (IL); Yaniv Kopelman, Holon (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/715,581

(22) Filed: Mar. 2, 2010

Related U.S. Application Data (63) Continuation of application No. 10/896,727, filed on Jul. 22, 2004, now Pat. No. 7,267,300.

(51) Int. Cl.
*H04L 12/50* (2006.01)
(52) U.S. Cl. ........................ 370/366; 370/463
(58) Field of Classification Search .................. 370/366, 370/367, 462, 463, 535–545
See application file for complete search history.

(56) References Cited

U.S. PATENT DOCUMENTS

| | | | |
|---|---|---|---|
| 5,668,948 A | 9/1997 | Belknap et al. |
| 5,896,417 A | 4/1999 | Lau |
| 6,023,472 A | 2/2000 | Kupchik et al. |
| 6,310,882 B1 | 10/2001 | Lorenz et al. |
| 6,345,310 B1 | 2/2002 | Allison et al. |
| 6,385,208 B1 | 5/2002 | Findlater et al. |
| 6,490,281 B1 | 12/2002 | Abler et al. |
| 6,516,352 B1 | 2/2003 | Booth et al. |
| 6,529,529 B1 | 3/2003 | Tohkairin |
| 6,944,163 B2 | 9/2005 | Bottorff et al. |
| 7,343,425 B1 | 3/2008 | Lo et al. |
| 7,440,475 B2 | 10/2008 | Kubo et al. |
| 2002/0075845 A1 | 6/2002 | Mullaney et al. |
| 2002/0194415 A1 | 12/2002 | Lindsay et al. |
| 2005/0036524 A1 | 2/2005 | Wojtowicz |
| 2005/0135434 A1 | 6/2005 | Choi et al. |

FOREIGN PATENT DOCUMENTS

WO    WO 01/41339 A2    7/2001

OTHER PUBLICATIONS

IEEE Standard 802.3, IEEE Standard for Information technology—Telecommunications and information exchange between systems—Local and metropolitan area networks—Specific requirements; Part 3: Carrier sense multiple access with collision detection (CSMA/CD) access method and physical layer specifications, Mar. 8, 2002, pp. 147-249.

(Continued)

*Primary Examiner* — Kwang B Yao
*Assistant Examiner* — Tung Q Tran (57) ABSTRACT

A network device includes a multi-port media access controller (MAC) device that comprises a plurality of MAC devices. Some of the MAC devices output respective data streams at different speeds. A plurality of speed translators translates the speeds of the respective data streams to be greater than or equal to a highest output speed of the plurality of MAC devices and generates parallel speed translated data streams. A multiplexer multiplexes the parallel speed translated data streams to generate a multiplexed data stream corresponding to one of the plurality of MAC devices with the highest output speed defined by the parallel speed translated data streams. A first serializer and deserializer receives the multiplexed data stream that is encoded at a physical coding sublayer and serially transmits the multiplexed data stream to a multi-port physical layer device.

22 Claims, 7 Drawing Sheets

OTHER PUBLICATIONS

IEEE Standard 802.3, IEEE Standard for Information technology—Telecommunications and information exchange between systems—Local and metropolitan area networks—Specific requirements; Part 3: Carrier sense multiple access with collision detection (CSMA/CD) access method and physical layer specifications, Mar. 8, 2002, pp. 1-173.

IEEE Standard 802.3z, In IEEE 802.3, "Part 3: Carrier sense multiple access with collision detection (CSMA/CD) access method and physical layer specifications", Mar. 8, 2002, Sections 34-39, 41-42, pp. 1-146, 250-281.

IEEE Standard 802.3ab, In IEEE 802.3, "Part 3: Carrier sense multiple access with collision detection (CSMA/CD) access method and physical layer specifications", Mar. 8, 2002, Section 40, pp. 147-249.

NETWORK DEVICE WITH MULTIPLE MAC/PHY PORTS

CROSS-REFERENCE TO RELATED APPLICATIONS

This application is a continuation of U.S. patent application Ser. No. 10/896,727, filed Jul. 22, 2004, which is related to U.S. patent application Ser. No. 10/646,601 (now U.S. Pat. No. 7,343,425), filed Aug. 21, 2003, which are hereby incorporated by reference in their entirety.

FIELD OF THE INVENTION

The present invention relates to network devices, and more particularly to multi-port network devices.

BACKGROUND OF THE INVENTION

When a network device includes multiple ports, separate links are used to connect physical layer (PHY) devices to corresponding medium access control (MAC) devices for each port. For example, when the network device includes four ports, four PHY and MAC devices are individually connected to each other.

For lower speeds such as 10/100 Mb/s, a medium independent interface (MII) may be used to connect each MAC/PHY pair. Gigabit Ethernet switches use a Gigabit media independent interface (GMII) to connect MAC/PHY pairs. GMII is a parallel interface that includes traces that run simultaneously at a fixed frequency between the paired MAC and PHY devices. The GMII interface works well for Gigabit Ethernet switches with one port or with relatively few ports. When additional ports are added, problems may arise relating to the relatively high number of pins, synchronization, cost and interference.

A reduced GMII (RGMII) decreased the number of pins by increasing the data frequency. The lower number of pins reduced the cost. However, running more energy through each trace increased the likelihood of interference. A serial Gigabit interface was developed using a pair of serializer/deserializers to solve problems associated with the GMII and RGMII parallel interfaces. While parallel connections allow high data rates over short distances, serial links permit longer connections and reduce synchronization issues. Despite having a higher transmit frequency, the serial interference is not as problematic because the signals do not travel in synch. The serial Gigabit interface format also allows SERDES components to be integrated on the same chip.

Figure 1:
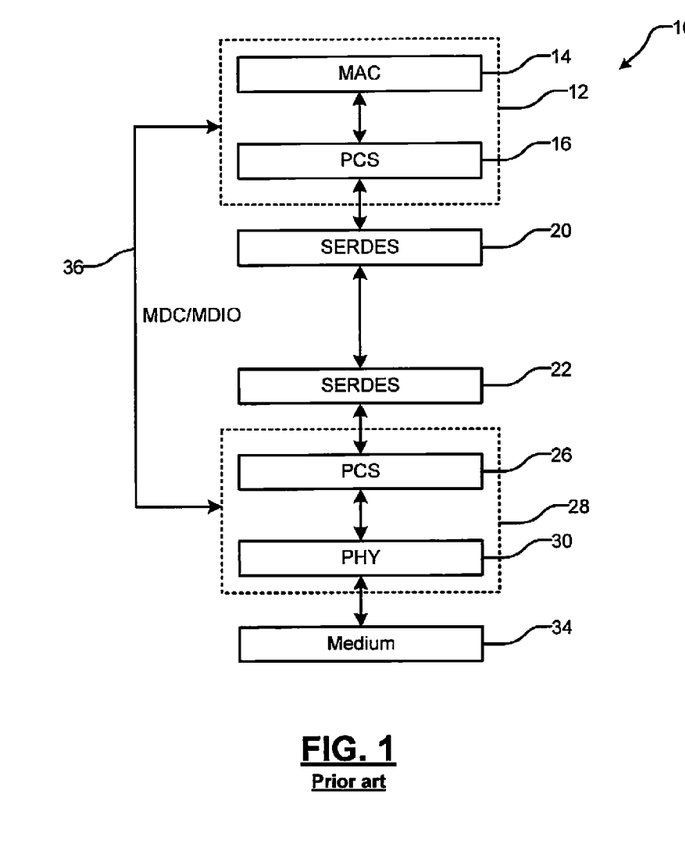
FIG. 1 is a functional block diagram of a network device that includes MAC and PHY devices that are connected by a SERDES according to the prior art.

Referring now to FIG. 1, a network device 10 includes a medium access control (MAC) device 12 with a Gigabit MAC 14 and a physical coding sublayer (PCS) device 16. An output of the MAC device 12 is input to a first SERDES 20, which provides a serial link at a fixed data rate. A second SERDES 22 communicates with the first SERDES 20 and is connected to a PCS 26 of a PHY device 28 that also includes a PHY 30. The MAC device 12 communicates with higher level layers. The PHY 30 communicates with a medium 34. The PCS 16 may perform 8/10 bit encoding as specified by 802.3z, which increases the data rate to 1.25 Gb/s, or other suitable PCS coding may be used. A serial management interface 36 provides control information between the MAC and the PHY. Because the first and second SERDES 20 and 22 must operate at 1.25 Gb/s, a solution was required for MACs 14 that operate at lower data rates such as 10 or 100 Mb/s.

SUMMARY OF THE INVENTION

A network device comprises a multi-port MAC device that includes N MAC ports and that outputs a port multiplexed and encoded parallel data stream. A first serializer/deserializer (SERDES) serializes the port multiplexed and encoded parallel data stream from the multi-port MAC device.

In other features, the multi-port MAC device further comprises a first multiplexer/demultiplexer (MUX/DEMUX) that multiplexes data from and demultiplexes data to the N MAC ports. The multi-port MAC device further comprises a first physical coding sublayer (PCS) device that communicates with the first MUX/DEMUX and the first SERDES and that encodes data from and decodes data to the first MUX/DEMUX.

In yet other features, a second SERDES communicates with the first SERDES. A multi-port physical layer (PHY) device includes N PHY ports and communicates with the second SERDES. The multi-port PHY device includes a second physical coding sublayer (PCS) device that decodes data from and encodes data to the second SERDES. The multi-port PHY device includes a second MUX/DEMUX that communicates with the second PCS device and the N PHY ports and that demultiplexes data from and multiplexes data to the second PCS device.

In yet other features, at least one of the N MAC ports operates at multiple speeds. At least one of the N MAC ports operates at a speed that is different than a speed of at least another of the N MAC ports.

In other features, the multi-port MAC device comprises N speed translators that receive the parallel data stream from respective ones of the N MAC ports and that selectively outputs a speed translated data stream. A first MUX/DEMUX multiplexes data from and demultiplexes data to the N translators. A physical coding sublayer (PCS) device communicates with the first MUX/DEMUX and the first SERDES and encodes the data stream from the first MUX/DEMUX and outputs an encoded data stream to the first SERDES.

In other features, all of the N MAC ports have a nominal speed of operation of one of 10 Mb/s, 100 Mb/s, 1 Gb/s and 10 Gb/s. The N MAC ports selectively operate at least one of 10 Mb/s, 100 Mb/s, 1 Gb/s and 10 Gb/s.

A transmit path of a network device comprises a multi-port MAC device that includes N MAC ports and that outputs a port multiplexed and encoded parallel data stream. A serializer serializes the port multiplexed and encoded parallel data stream from the multi-port MAC device.

A receive path of a network device comprises a multi-port PHY device that includes N PHY ports and that outputs a port multiplexed and encoded parallel data stream. A serializer serializes the port multiplexed and encoded parallel data stream from the multi-port PHY device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, or other suitable components that provide the described functionality.

Figure 2:
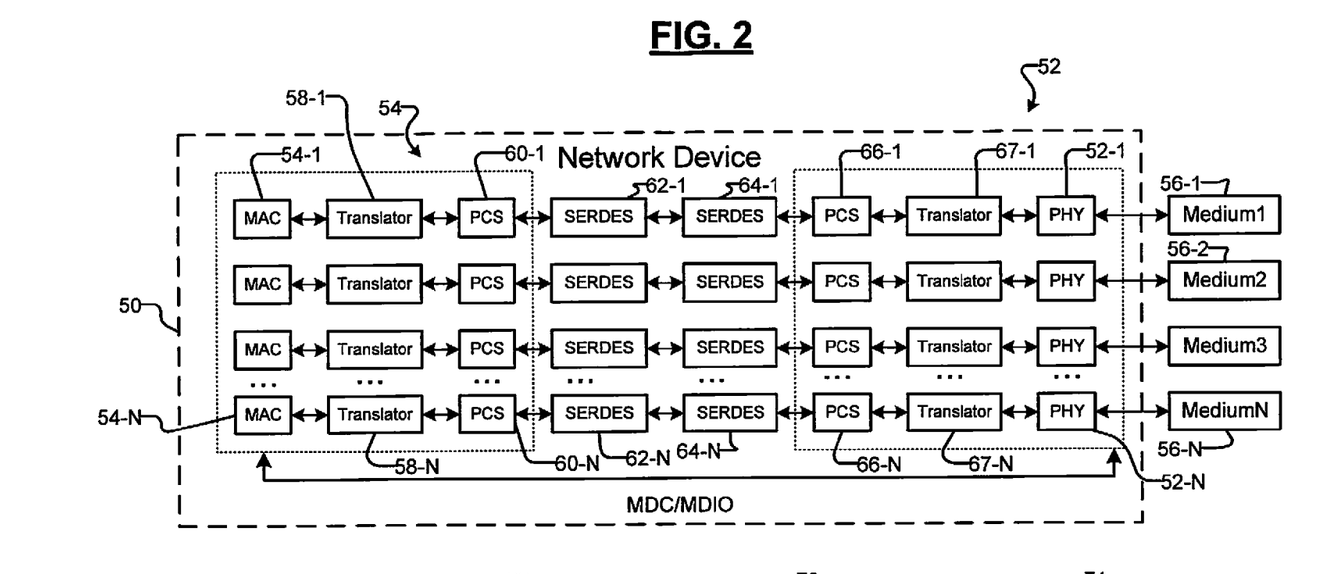
FIG. 2 is a functional block diagram of a network device including multi-port MAC and PHY devices.

Referring now to FIG. 2, an exemplary network device 50 such as switch or a router includes a multi-port PHY device 52 and a multi-port MAC device 54. The PHY devices 52-1, 52-2, 52-3, ..., and 52-N communicate with mediums 56-1, 56-2, 56-3, ..., and 56-N, respectively. For example, the medium 56-1 may be 10BASE-T compliant, the medium 56-2 may be 100BASE-TX compliant, and the medium 56-3 may be 1000BASE-T compliant.

The MAC device 54 includes 10/100/1000 MAC devices 54-1, 54-2, ..., and 54-N, which are connected by speed translators 58-1, 58-2, 58-3, ..., 58-N and physical coding sublayer (PCS) devices 60-1, 60-2, ..., and 60-N (collectively referred to as PCS devices 60) to SERDES 62-1, 62-2, ..., and 62-N (collectively referred to as SERDES 62), respectively. The SERDES 62-1, 62-2, ..., and 62-N communicate with SERDES 64-1, 64-2, ..., and 64-N (collectively referred to as SERDES 64), respectively, that are associated with the PHY devices 52. The SERDES 64-1, 64-2, ..., and 64-N are connected by PCS devices 66-1, 66-2, ..., and 66-N (collectively referred to as PCS devices 66) and speed translators 67-1, 67-2, ..., 67-N to PHY devices 52-1, 52-2, ..., and 52-N, respectively.

Figure 3A:
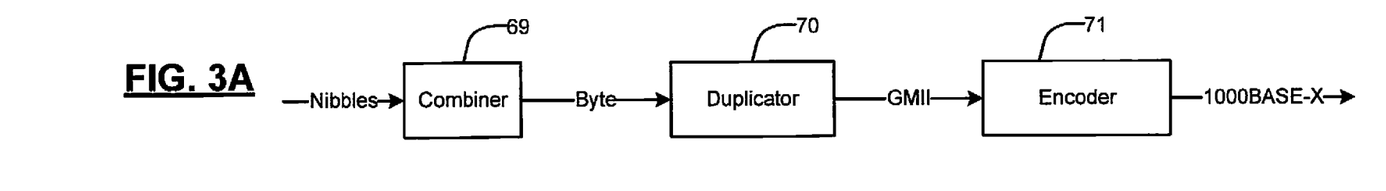
FIGS. 3A and 3B are functional block diagrams multi-port network devices including speed translators.
Figure 3B:
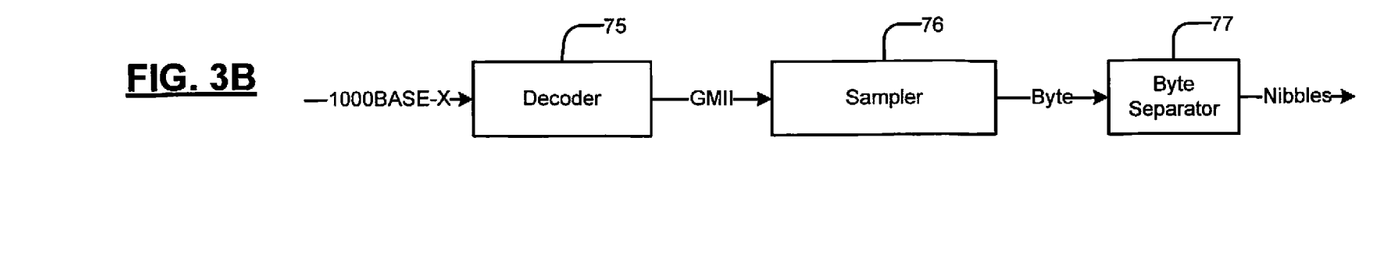

Referring now to FIGS. 2, 3A and 3B, the PHY device 52 and the MAC device 54 operate using the serial Gigabit interface. Control and data bytes are passed serially. Since the data rates can be 10 Mb/s (10BASE-T), 100 Mb/s (100BASE-T) and 1000 Mb/s (1000BASE-T), the 10BASE-T and 100BASE-T rates are adjusted to 1000 Mb/s to provide a common data rate for the SERDES 62 and 64. Therefore, the data translator 58 duplicates the data at 10 Mb/s 100 times and the data at 100 Mb/s 10 times. The reverse process is performed by the speed translator 67. The data at 1000 Mb/s is not altered by the speed translators 58 and 67.

In 10 Mb/s and 100 Mb/s modes, data is typically packaged in nibbles. Prior to replicating the data, a combiner 69 combines two adjacent nibbles into a byte. A byte duplicator 70 duplicates bytes 10 times when receiving 100 Mb/s data streams and 100 times when receiving 10 Mb/s data streams. The output of the duplicator 70 is a Gigabit Media Independent Interface (GMII) data stream that is input to an encoder 71. The encoder 71 may perform 8/10 bit encoding. The encoder 71 receives the bytes from the duplicator 30 and outputs a 1000BASE-X data stream.

Going in the reverse direction, a bit decoder 75 receives the 1000-BASE-X data stream from the SERDES 62. The decoder 75 outputs a GMII data stream to a sampler 76. The sampler 76 samples 1 out of 10 bytes for 100 Mb/s and 1 out of 100 bytes for 10 Mb/s. A byte separator 77 separates the bytes into nibbles. The serial Gigabit interface uses a modified form of 1000BASE-X autonegotiation to pass speed, link, and duplex information.

Figure 4:
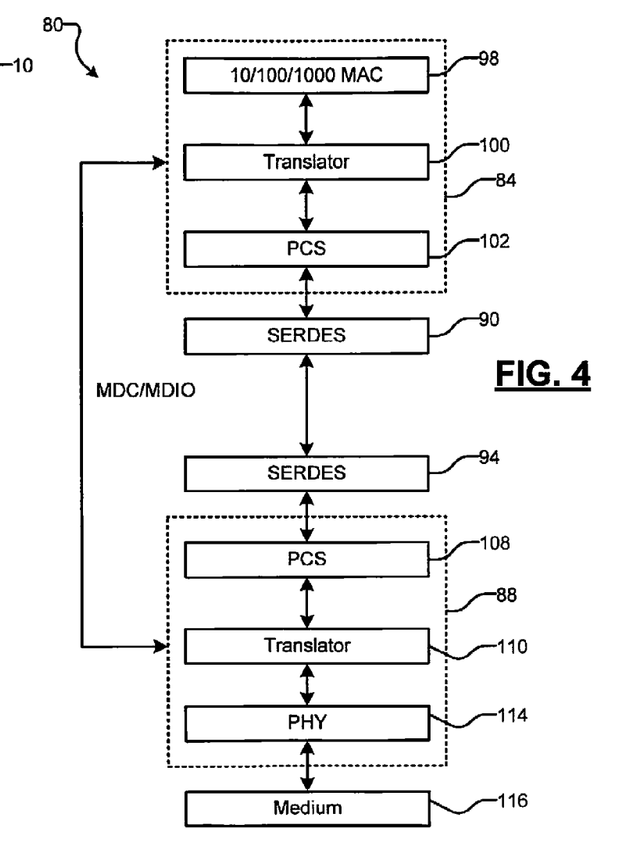
FIG. 4 is a functional block diagram of a network device that includes MAC and PHY devices that operate at multiple speeds and that are connected by a SERDES.

Referring now to FIG. 4, a network device 80 implements another form of translation and includes a MAC device 84 and a PHY device 88. Additional details can be found in U.S. patent Ser. No. 10/646,601, filed Aug. 21, 2003, which is hereby incorporated by reference in its entirety. The MAC device 84 and the PHY device 88 are connected by SERDES 90 and 94, which operates at a fixed data rate such as 1.25 Gb/s although other data rates can be used. The MAC device 84 and the PHY device 88 are capable of operating at 10 Mb/s, 100 Mb/s, 1000 Mb/s and/or other speeds.

The MAC device 84 includes a 10/100/1000 MAC 98 that communicates with a speed translator 100. The speed translator 100 appends and duplicates data to provide the desired higher data rate. The speed translator 100 outputs translated data to a PCS device 102, which codes the data.

The PHY device 88 includes a PCS 108, which decodes the data that is received from the SERDES 94. A data translator 110 reverses the operation that was performed by the data translator 100 and outputs data to the PHY 114, which communicates with a medium 116. A MDC/MDIO 90 may operate as described in IEEE section 22 of 802.3, which is hereby incorporated by reference in its entirety.

Figure 5A:
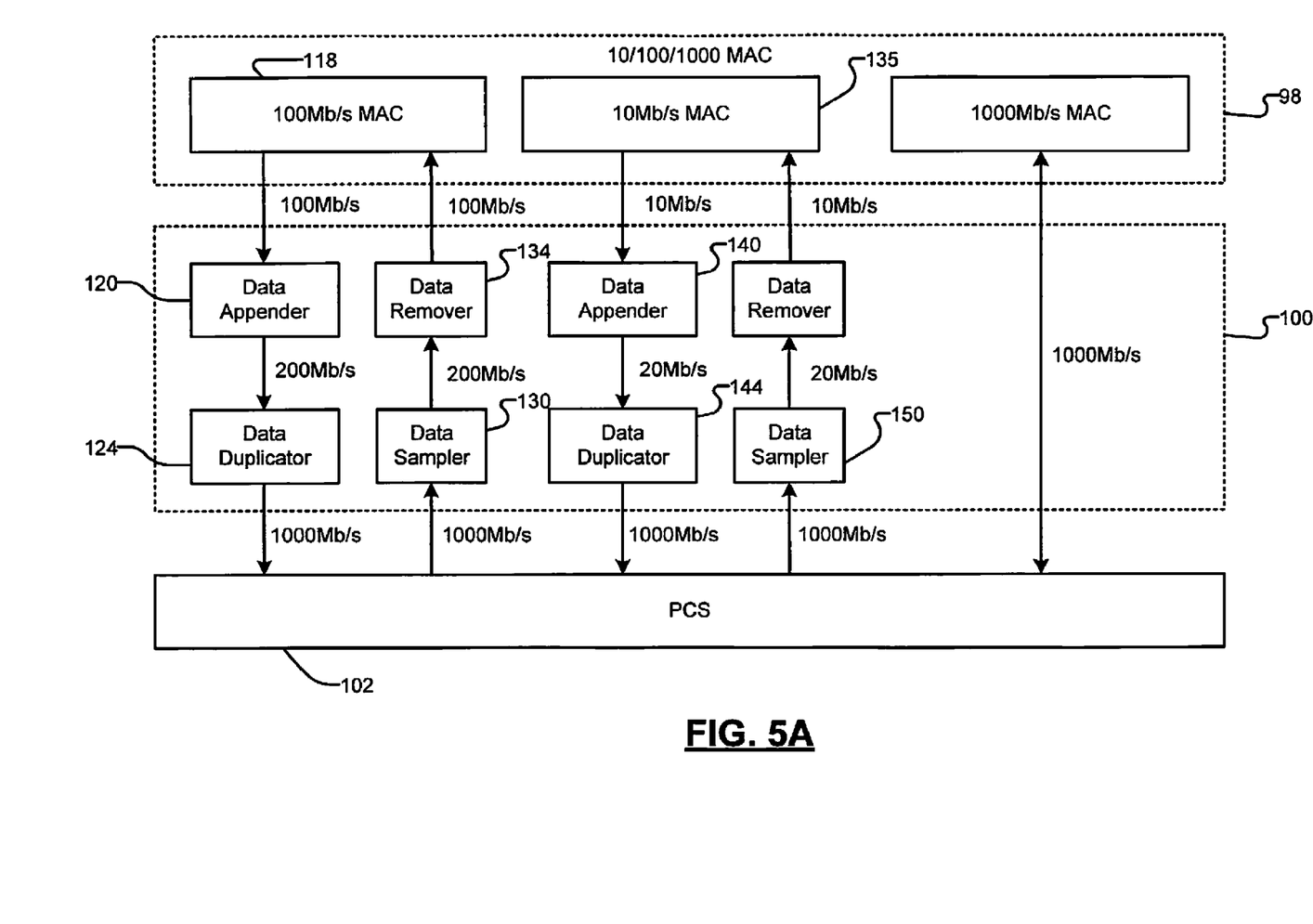
FIGS. 5A and 5B illustrate other types of speed translators in further detail.
Figure 5B:
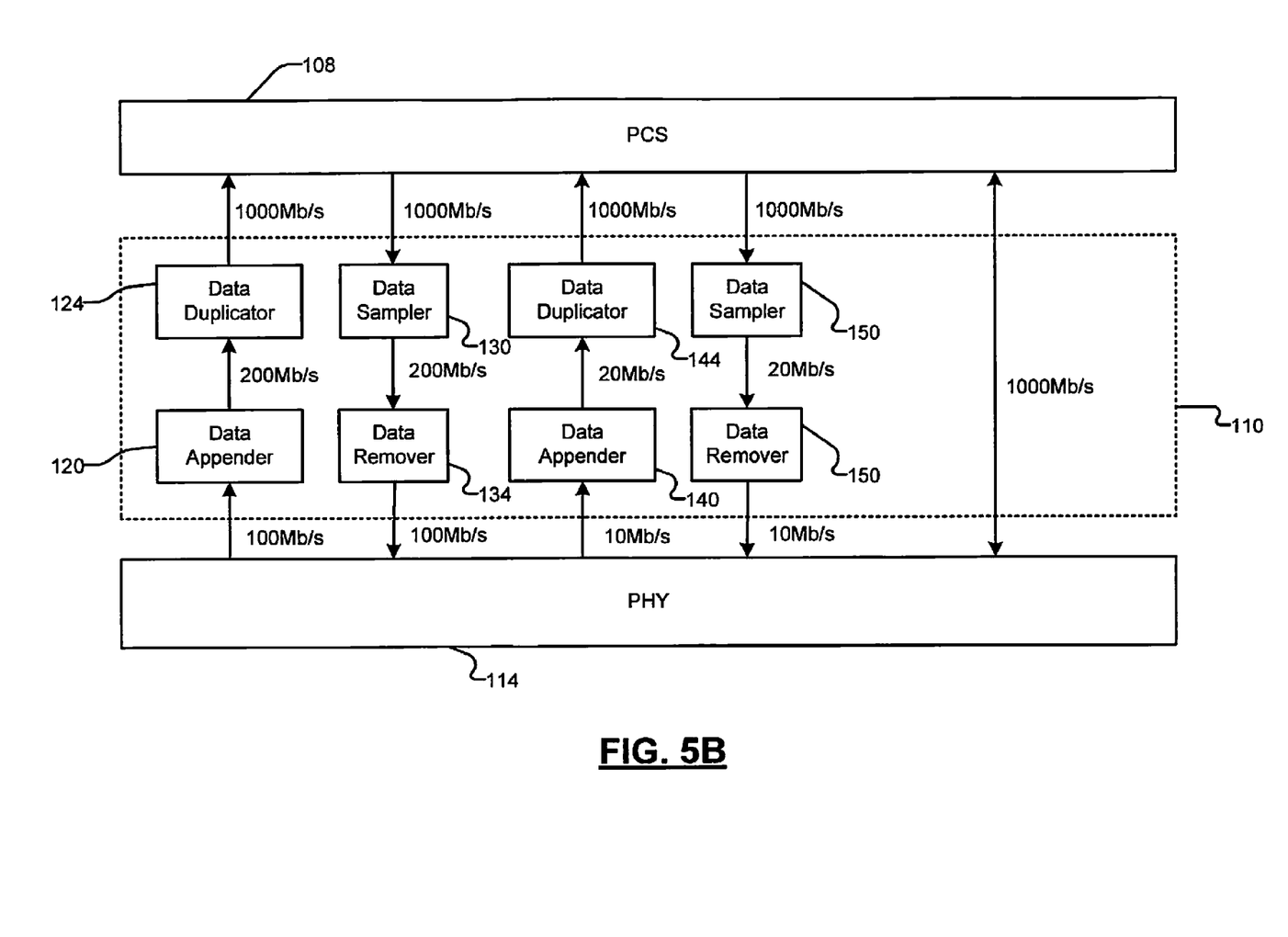

Referring now to FIGS. 5A and 5B, the speed translator 100 is shown in further detail. When the MAC 98 is operating at 1000 Mb/s, the speed translator 100 passes the data (without change) to the PCS 102. When the MAC 98 is operating at 100 Mb/s, the MAC 98 outputs nibbles (4 bits) at a rate of 100 Mb/s. The speed translator 100 includes a data appender 120 that appends 4 additional bits to form a byte, which increases the data rate to 200 Mb/s. Any 4 bit pattern can be used. For example, 0101 can be added to the MSB positions and the nibble can be located in the LSB positions. The 4 appended bits can also be located in the LSB positions, in the middle of the byte, and/or interspersed. The output of the data appender 120 is input to a data duplicator 124. The data duplicator 124 duplicates the bytes five times to generate an output data stream at 1000 Mb/s, which is output to the PCS 102. The PCS 102 encodes the data and outputs the data to the SERDES 90.

Data flowing in the opposite direction from the PCS 102 to the MAC 98 is decoded in an opposite manner. The data sampler 130 samples one of every 5 bytes of the data and outputs data at 200 Mb/s. A data remover 134 removes the appended 4 bits, recovers the nibble and the data rate is reduced to 100 Mb/s.

When the MAC 98 operates at 10 Mb/s (as shown at 135), the MAC 98 sends data to a data appender 140 and a data duplicator 144, which operate in a manner that is similar to the data appender 120 and the data duplicator 124. However, the data duplicator 124 duplicates the data 50 times instead of 5 times. Continuing with the example set forth above, the MAC 98 outputs data at 10 Mb/s to the data appender 140, which appends 4 bits to each received nibble. The data duplicator 144 duplicates the data 50 times. The PCS 102 encodes the data as described above and outputs the encoded data to the SERDES 90. In the opposite direction, a data sampler 150 samples one of every 50 bytes and outputs data at 20 Mb/s. A data remover 154 removes one or more appended bits to recover the nibbles and the data rate is reduced to 10 Mb/s. In FIG. 5B, the translator 110 reverses the steps performed by the translator 100.

Figure 6:
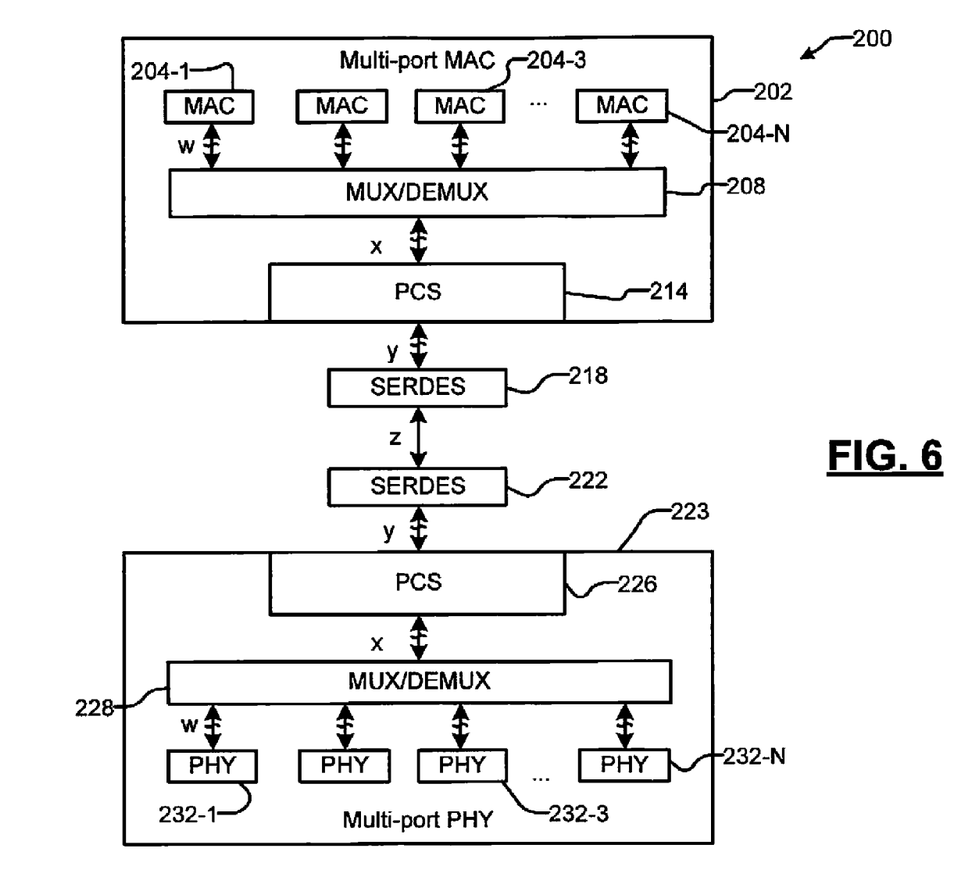
FIG. 6 is a functional block diagram of a first exemplary interface for a network device having multiple MAC/PHY ports that are connected by a single SERDES pair according to the present invention.

Referring now to FIG. 6, a network device 200 according to the present invention is shown to include a multi-port MAC 202 including N MAC devices 204-1, 204-2, . . . and 204-N (collectively MAC devices 204). Outputs of the N MAC devices 204-1, 204-2, . . . and 204-N are multiplexed/demultiplexed by a multiplexer/demultiplexer (MUX/DEMUX) 208. An output of the MUX/DEMUX 208 communicates with a physical coding sublayer (PCS) device 214, which provides coding and decoding for delineation and/or scrambling. The PCS device 214 communicates with a first serializer/deserializer (SERDES) 218, which serializes data from and deserializes data to the PCS device 214.

A second SERDES 222 deserializes/serializes communications from the first SERDES 218 and a multi-port PHY device 223, respectively. The multi-port PHY device 223 includes a PCS device 226 that communicates with a MUX/DEMUX 228, which demultiplexes the data stream from the PCS device 226 and multiplexes a data stream from N PHY devices 232-1, 232-2, . . . and 232-N (collectively PHY devices 232).

In this implementation, all of the MAC and PHY devices 204 and 232, respectively, operate at the same speed. On the transmit path, the MAC devices 204 output a parallel data stream at speed w. The MUX/DEMUX 208 multiplexes the parallel data streams from the MAC devices 204 to generate a multiplexed parallel data stream at speed $x=N*w$. The PCS device 214 performs coding on the multiplexed data stream and outputs a coded parallel data stream at speed y, where $y \geq x$. The difference between x and y represents coding overhead. The SERDES 218 serializes the coded parallel data stream to generate a serialized data stream at speed z, where $z \geq N*y$.

The SERDES 222 deserializes the serial data stream at speed z to generate the coded parallel data stream at speed y. The PCS device 226 decodes the coded parallel data stream and outputs a decoded data stream at speed x to the MUX/DEMUX 228. The MUX/DEMUX 228 demultiplexes the decoded data stream and outputs a data stream at speed w to the N PHY devices 232, which outputs the data to the medium.

For example, in one implementation, N=4 and w=1 Gb/s. The MUX/DEMUX 208 outputs a parallel data streams at x=4 Gb/s. The PCS device 214 performs 8/10 bit coding and outputs the parallel data stream at y=5 Gb/s. The SERDES 218 outputs a serial data stream at $z \geq N*y$ Gb/s. As can be appreciated, higher and lower speeds and other types of PCS coding may be implemented. The coding performed by the PCS devices 214 and 226 may include information identifying the port of the data stream. Alternately, a port delimiter may be used. In another approach, each X-bit word that is to be coded by the PCS can include one or more data bits from each of the ports as will be described further below. For example, eight (or less) ports can be accommodated by an 8/10 bit PCS.

On the receive path, the PHY devices 232 output a parallel data stream at speed w to the MUX/DEMUX 228, which multiplexes the parallel data stream and outputs a multiplexed parallel data stream at speed x. The PCS device 226 encodes the multiplexed parallel data stream and outputs a coded parallel data stream. The SERDES 222 serializes the coded data stream and transmits a serialized data stream at speed z to the SERDES 218.

The SERDES 222 deserializes the serialized data stream and outputs the deserialized data stream to the PCS device 214, which decodes the data stream. The MUX/DEMUX 208 demultiplexes the data stream and outputs parallel data streams to the MAC devices 204.

Figure 7A:
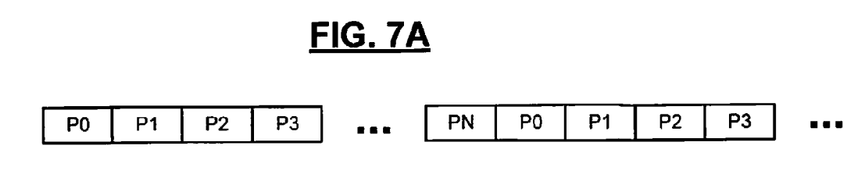
FIGS. 7A, 7B and 7C illustrate multiplexing of port data through the SERDES.
Figure 7B:
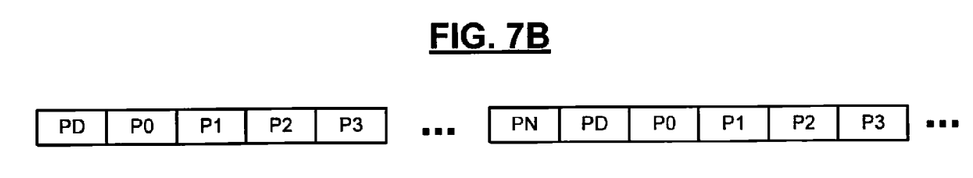

Referring now to FIGS. 7A and 7B, the output of the MUX/DEMUX 208 on the transmit path is shown. Data streams P0, P1, . . . PN from the ports of the network device are multiplexed. In FIG. 7B, a port delineator PD may be added between the N port data streams in some implementations. Alternately, the coding performed by the PCS may contain port delineators and the port delineator may be omitted. In other words, one of the reserved PCS symbols may be used as a port delineator.

In FIG. 7B, the ports are not identified by the coding—only the start of the byte stream is identified by a special symbol (i.e. delimiter). Since the byte stream order is fixed (for example, TDM) then the only information needed is the start of stream delimiter.

Figure 7C:
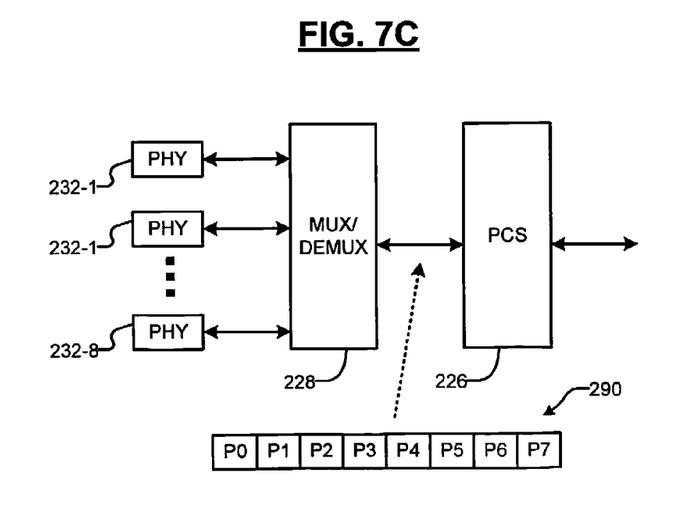

In FIG. 7C, the data stream may be passed on a bit-by-bit basis to the MUX/DEMUX 228. In other words, the 8 (or less) bits are output by the 8 (or less) PHYs 232 to the MUX/DEMUX 228 when an 8/10 bit PCS is used. The MUX/DEMUX 228 multiplexes the bits from the PHYs 232 and outputs an 8 bit stream 290 to the PCS 226. The PCS 226 encodes the 8 bits into 10 bits. This type of PCS coding/decoding limits the maximum number of ports supported to 8. As can be appreciated, 64/66 bit PCS coding/decoding can be used. Up to 64 ports can be supported using the 64/66 PCS coding/decoding as applied by a 10 Gb/s Ethernet PHY if the IDES is used to multiplex 10 1 Gb/s Ethernet ports on a XAUI (10 GE) interface. While a one bit per port approach is described above, still other variations are contemplated including but not limited to two bits from each port in a 4 port device using 8/10 bit PCS coding, 16 bits per port in a 4 port device using 64/66 PCS coding, etc. If the number of ports is not an integer divisor of the number of inputs bits of the PCS coding that is used, dummy data bits can be used with some loss of efficiency.

Figure 8:
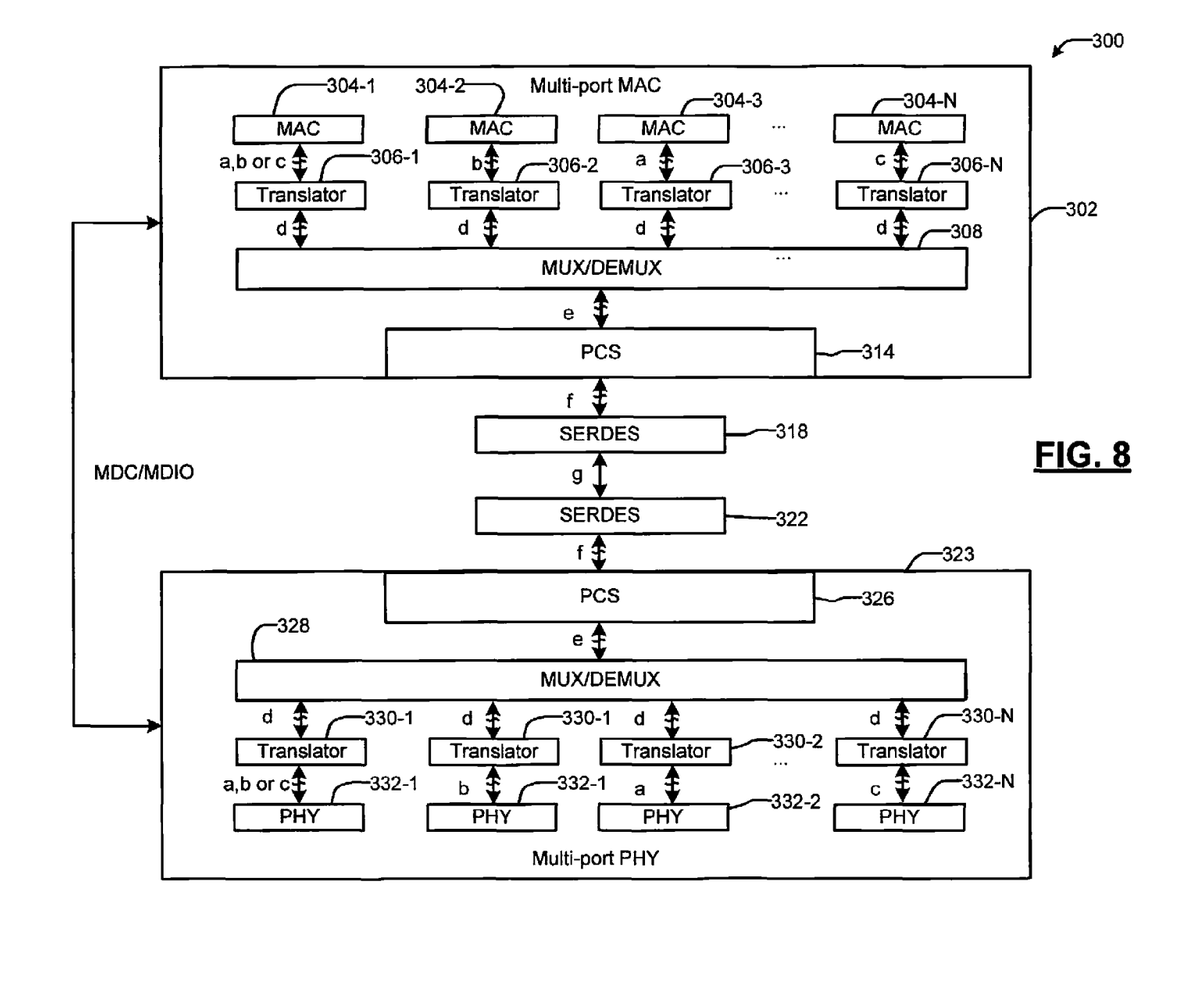
FIG. 8 is a functional block diagram of a first exemplary interface for connecting a device containing a multi-port MAC using a PCS, a MUX/DEMUX and a single SERDES on both ends of the interface.

Referring now to FIG. 8, a network device 300 comprises a multi-port MAC device 302 including N MAC devices 304-1, 304-2, . . . 304-N (collectively MAC devices 304) that operate at a single speed, different speeds and/or multiple speeds. Speed translators such as those described above in conjunction with FIGS. 2-5B or other suitable speed translators are used to accommodate different speeds and/or multiple speeds. MAC devices 304-1, 304-2, . . . and 304-N communicate with speed translators 306-1, 306-2, . . . and 306-N, respectively, which translate the speed of the data stream output by the MAC devices 304 to a highest speed. Alternately, the speed translators 306 may translate the speeds to a speed that is higher than the highest speed.

Outputs of the speed translators 306-1, 306-2, . . . , and 306-N communicate with MUX/DEMUX 308, which multiplexes the data stream. An output of the MUX/DEMUX 308 communicates with a PCS device 314, which provides coding for delineation and scrambling. The PCS device 314 communicates with a first serializer/deserializer (SERDES) 318, which serializes the data stream.

A second SERDES 322 communicates with the first SERDES 218 and with multi-port PHY device 323 that includes a PCS device 326. The PCS device 326 communicates with MUX/DEMUX 328. Outputs of the MUX/DEMUX communicate with speed translators 330-1, 330-2, . . . 330N, respectively, which reduce the speed of the data stream to the original speed for output to the respective PHY devices 332-1, 332-2, ... and 332-N (collectively PHY devices 332).

On the transmit path, the MAC device 304 outputs a parallel data stream at speed a, b or c. While three speeds are described, additional or fewer speeds may be used. The speed translator 306 translates the speed using the techniques described above to the highest used speed or to a higher speed. For example, d=c, d=10*b, or d=100*a. The MUX/DEMUX 308 multiplexes the data stream with other data streams and outputs a multiplexed data stream at speed e, where e≧N*d. The PCS device 314 performs coding and outputs a coded data stream at speed f, where f>e. The SERDES 318 serializes the coded parallel data steam to generate a serial data stream at speed g, where g≧N*e.

The SERDES 322 deserializes the serial data stream to generate the coded parallel data stream. The PCS device 326 decodes the coded parallel data stream. The MUX/DEMUX 328 demultiplexes an output of the PCS device 326 and outputs data streams at speed d to the translators 330. The translators 330 translate the data to the original speed (a, b or c) for output to the PHY devices 332, which output the data to the medium (not shown).

For example, in one implementation, N=4, a=10 Mb/s, b=100 Mb/s, c=1 Gb/s, d=1 Gb/s, e=4 Gb/s, f=5 Gb/s (PCS 314 uses 8/10 bit encoding), and g=20 Gb/s. As can be appreciated, higher and lower speeds and other types of PCS coding may be implemented. Also, the MAC devices 304 may have a single speed that differs from other MAC devices 304. For example, in FIG. 8, the MAC device 304-2 operates at speed b, the MAC device 304-32 operates at speed a and the MAC device 304-N operates at speed c. As can be appreciated, the translator 306-N may optionally be omitted when c=d. All of the MAC devices 304 may operate at multiple speeds in a manner similar to MAC 304-1, which can operate at speeds a, b or c.

On the receive path, the PHY devices 332 output parallel data streams at speed a, b or c to the translators 330, which translates the speed to speed d. The MUX/DEMUX 328 multiplexes the encoded parallel data stream and outputs a multiplexed parallel data stream. The PCS device 326 encodes the parallel data stream and outputs an encoded parallel data stream at speed f. The SERDES 322 serializes the data stream and transmits a serialized data stream at speed g to the SERDES 318. The SERDES 318 deserializes the serialized data stream and outputs the deserialized data stream to the PCS device 314, which outputs a decoded parallel data stream. The MUX/DEMUX 308 demultiplexes the data stream and outputs data streams to the translators 306, which translate the speed d to speed a, b or c for the MAC devices 304.

As can be appreciated, by reducing the number of lines that are required to connect the multi-port MAC device to the multi-port PHY device, routing is simplified. The use of the serial link permits the use of longer connections and reduces synchronization issues. In some implementations of FIGS. 6 and 8, a serial management interface may be provided between the multi-port MAC and PHY devices as shown in FIGS. 1, 2 and 4. For example, the MDC/MDIO interface can be used for, among other things, autonegotiation. While some embodiments have been described in conjunction with 10/100/1000 Mb/s speeds and copper as a medium, other speeds and mediums may be used.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A network device, comprising:
   a multi-port media access controller (MAC) device that comprises a plurality of MAC devices, wherein some of the plurality of MAC devices output respective data streams at different speeds,
   a plurality of speed translators configured to translate the speeds of the respective data streams to a speed greater than a highest output speed of any MAC device among the plurality of MAC devices and to generate parallel speed translated data streams;
   a multiplexer configured to multiplex the parallel speed translated data streams to generate a multiplexed data stream at the speed that is greater than the highest output speed defined by the parallel speed translated data streams; and
   a first serializer and deserializer (SERDES) configured to receive the multiplexed data stream that is encoded at a physical coding sublayer (PCS) and to serially transmit the multiplexed data stream to a multi-port physical layer (PHY) device.

2. The network device of claim 1, further comprising a multiplexer and demultiplexer (MUX/DEMUX) device that includes the multiplexer and is configured to multiplex data received from and demultiplex data transmitted to the plurality of MAC devices.

3. The network device of claim 1, wherein the plurality of speed translators comprise:
   a first appender configured to append a first plurality of bits to a first parallel data stream;
   a second appender configured to append a second plurality of bits to a second parallel data stream;
   a first duplicator configured to duplicate output of the first appender Y times to generate a first speed translated data stream; and
   a second duplicator configured to duplicate output of the second appender Z times to generate a second speed translated data stream, where Y and Z are each integers greater than 1 and Y is less than Z.

4. The network device of claim 3, wherein:
   the plurality of speed translators receive parallel data streams including the respective data streams from respective ones of the plurality of MAC devices and selectively output the parallel speed translated data streams;
   the parallel data streams comprise the first parallel data stream and the second parallel data stream; and
   the parallel speed translated data streams comprise the first speed translated data stream and the second speed translated data stream.

5. The network device of claim 4, wherein:
   the parallel speed translated data streams have a common speed; and
   the common speed is higher than or equal to the highest output speed.

6. The network device of claim 3, wherein the first appender does not append the first plurality of bits to the second parallel data stream.

7. The network device of claim 3, wherein the plurality of speed translators comprise:
   a first speed translator configured to translate a first data rate of the first parallel data stream to a second data rate; and a second speed translator configured to translate a third data rate of the second parallel data stream to the second data rate, wherein the first data rate is equal to the second data rate, and wherein the third data rate is different than the second data rate.

8. The network device of claim 3, wherein the plurality of speed translators comprise:

a first speed translator configured to translate a first data rate of the first parallel data stream to a second data rate; and a second speed translator configured to translate a third data rate of the second parallel data stream to the second data rate, wherein the first data rate is different than the second data rate, and wherein the third data rate is different than the first data rate and the second data rate.

9. The network device of claim 8, wherein:

the multi-port MAC device comprises a MUX/DEMUX;

the MUX/DEMUX is configured to receive N parallel speed translated data streams, where N is an integer greater than 1; and the MUX/DEMUX multiplexes the first speed translated data stream and the second speed translated data stream to generate a multiplexed data stream at a fourth speed that is greater than or equal to N multiplied by the second speed.

10. The network device of claim 3, wherein at least one of:

the first appender appends the first plurality of bits in least significant bit positions of the first parallel data stream; and the second appender appends the second plurality of bits in least significant bit positions of the second parallel data stream.

11. The network device of claim 3, wherein at least one of:

the first appender appends the first plurality of bits in most significant bit positions of the first parallel data stream; and the second appender appends the second plurality of bits in most significant bit positions of the second parallel data stream.

12. The network device of claim 1, further comprising:

a second SERDES; and the multi-port PHY device, wherein the first SERDES is configured to transmit the multiplexed data stream to the second SERDES, and wherein the multi-port PHY device includes a plurality of PHY devices and is configured to communicate with the second SERDES.

13. The network device of claim 1, wherein:

the multi-port MAC device further comprises a first multiplexer/demultiplexer (MUX/DEMUX) device that includes the multiplexer and is configured to multiplex data received from and demultiplex data transmitted to the plurality of MAC devices; and the multi-port MAC device further comprises:

a first physical coding sublayer (PCS) device configured to communicate with the first SERDES and encode data received from and decode data transmitted to the first MUX/DEMUX; and a second PCS device configured to decode data received from and encode data transmitted to a second SERDES.

14. The network device of claim 13, further comprising the multi-port PHY device, wherein the multi-port PHY device includes a second MUX/DEMUX configured to communicate with the second PCS device and a plurality of PHY devices of the multi-port PHY device, and wherein the second MUX/DEMUX is configured to demultiplex data received from and multiplex data transmitted to the second PCS device.

15. The network device of claim 13, wherein:

the multi-port MAC device comprises a demultiplexer; and the demultiplexer demultiplexes data from the second PCS and outputs the demultiplexed data to the plurality of MAC devices.

16. A network device comprising:

a serializer and deserializer (SERDES) device configured to transmit a serial data stream to a multi-port media access controller (MAC) device, wherein:

the multi-port MAC device comprises a plurality of MAC devices;

at least some of the plurality of MAC devices operate at different speeds; and the serial data stream is received at a speed that is higher than or equal to a highest output speed of any of the plurality of MAC devices;

a demultiplexer configured to demultiplex a decoded data stream to generate a plurality of demultiplexed data streams corresponding to respective ports of the multi-port MAC device, wherein the decoded data stream is generated by decoding the serial data stream; and a plurality of speed translators that receive the plurality of demultiplexed data streams and is configured to generate respective data streams by translating speeds of the demultiplexed data streams to different speeds that are lower than or equal to respective speeds of the plurality of MAC devices receiving the demultiplexed speed translated data streams.

17. The network device of claim 16, further comprising a physical coding sublayer (PCS) that is configured to decode the serial data stream and generate the decoded data stream.

18. The network device of claim 16, further comprising a multiplexer and demultiplexer (MUX/DEMUX) device that includes the multiplexer and is configured to multiplex data received from and demultiplex data transmitted to the plurality of MAC devices.

19. A network device, comprising:

a serializer and deserializer (SERDES) device configured to receive a multiplexed data stream that is encoded at a physical coding sublayer (PCS) and from a multi-port media access controller (MAC) device, wherein the multiplexed data stream is received at a speed that is greater than a highest output speed of any one of a plurality of MAC devices of the multi-port MAC device;

a demultiplexer configured to demultiplex the multiplexed data stream and generate parallel speed translated data streams;

a plurality of speed translators configured to generate respective data streams by translating speeds of the parallel speed translated data streams to different speeds that are lower than or equal to respective speeds of a plurality of PHY devices receiving the parallel speed translated data streams; and a multi-port physical layer (PHY) device that comprises the plurality of PHY devices, wherein the plurality of PHY devices transmit the respective data streams.

20. A network device comprising:

a serializer and deserializer (SERDES) device configured to receive a serial data stream from a multi-port PHY device;

a multi-port MAC device comprises a plurality of MAC devices, at least some of the plurality of MAC devices operate at different speeds;

wherein the serial data stream is received at a speed that is higher than a highest output speed of any of the plurality of MAC devices;

a demultiplexer configured to demultiplex a decoded data stream to generate a plurality of demultiplexed data streams corresponding to respective ports of the multi-port MAC device, wherein the decoded data stream is generated by decoding the serial data stream; and a plurality of speed translators that receive the plurality of demultiplexed data streams and is configured to generate respective data streams by translating speeds of the demultiplexed data streams to different speeds that are lower than or equal to respective speeds of the plurality of MAC devices receiving the demultiplexed speed translated data streams.

21. The network device of claim 1, wherein the plurality of speed translators comprise:

a first appender configured to append a first plurality of bits to a first parallel data stream from a first one of the MAC devices, wherein the first plurality of bits are different than bits in the first parallel data stream; and a second appender configured to append a second plurality of bits to a second parallel data stream from a second one of the MAC devices, wherein the plurality of speed translators generate the parallel speed translated data streams based on the first parallel data stream and the second parallel data stream.

22. The network device of claim 21, further comprising:

a first duplicator configured to duplicate output of the first appender Y times to generate a first speed translated data stream; and a second duplicator configured to duplicate output of the second appender Z times to generate a second speed translated data stream, where Y and Z are each integers greater than 1 and Y is less than Z, wherein the parallel speed translated data streams comprises the first speed translated data stream and the second speed translated data stream.

\* \* \* \* \*